United States Patent [19]

Thuries

[11] 4,075,673
[45] Feb. 21, 1978

[54] OPERATING SYSTEM FOR GENERATOR CIRCUIT-BREAKERS

[75] Inventor: Edmond Thuries, Pusignan, France

[73] Assignee: Delle-Alsthom S.A., Villeurbanne, France

[21] Appl. No.: 713,474

[22] Filed: Aug. 11, 1976

[30] Foreign Application Priority Data

Aug. 11, 1975   France .............................. 75 25000

[51] Int. Cl.² .............................................. H01H 9/42
[52] U.S. Cl. ......................................... 361/10; 361/13
[58] Field of Search ....................... 361/10, 13, 20, 58, 361/62; 307/29, 38, 39, 41, 135

[56] References Cited

U.S. PATENT DOCUMENTS

| | | | |
|---|---|---|---|
| 1,850,321 | 3/1932 | Greenwood | 361/13 X |
| 3,538,278 | 11/1970 | Rathbun | 361/13 X |
| 3,543,047 | 11/1970 | Renfrew | 361/13 X |
| 3,777,178 | 12/1973 | Gratzmuller | 361/10 X |

Primary Examiner—Harry E. Moose, Jr.
Attorney, Agent, or Firm—Sughrue, Rothwell, Mion, Zinn and Macpeak

[57] ABSTRACT

The invention concerns a system of several circuit-breakers controlling separate circuits fed by the same generator and in which the circuit-breakers are provided with a main cut-out chamber ($C_1$, $C_2$) in parallel with a series connection of an auxiliary cut-out chamber ($E_1$, $E_2$) and of a resistor ($R_1$, $R_2$). An operating sequence opens firstly the main chambers ($C_2$) of all the circuit-breakers of circuits not affected by a failure, then, successively, the main chamber ($C_1$) and the auxiliary chamber ($E_1$) of the circuit-breaker of the circuit affected by the failure, and, lastly, closes the main chambers ($C_2$) of the circuit-breakers of the circuits not affected by the failure.

8 Claims, 2 Drawing Figures

OPERATING SYSTEM FOR GENERATOR CIRCUIT-BREAKERS

BACKGROUND OF THE INVENTION

1. Field of the Invention

The invention relates to the disposition of generator circuit-breakers in an electric power station.

2. Description of the Prior Art

The increase in the power of power stations increases the short-circuit current cut-out performances required of generator circuit-breakers.

Moreover, when the power of the generator is high, a configuration is often adopted in which a generator feeds two sets of bars connected to two separate circuits: two networks or two portions of networks, through two transformers each connected to the generator by a circuit-breaker. In the case of a short-circuit, for example between one of the transformers and the corresponding circuit-breaker, the said circuit-breaker must cut out a short-circuit current which is the sum of the current discharged by the generator and the current discharged by the other transformer. The extension of this already produced configuration could be provided for feeding more than two transformers with a single generator.

These dispositions are particularly advantageous when the powers of the generators are very high. Firstly, they increase the reliability of the network, for it is possible to discharge a part of the power, in the case of a breakdown, on the line which is not affected or the lines which are affected by the failure. Secondly, these dispositions facilitate the production of the transformers since the manufacturing and transport of very large units is difficult.

Furthermore, this configuration leads to the increasing of the short-circuit current which the circuit-breakers of the generators must cut, since the short-circuit current coming from the network or networks not affected by the failure is added to the generator short-circuit current. Now, in a high-power circuit-breakers it is generally much more difficult to increase the cut-out power than the closing power or the short-circuit current withstood during a short space time.

SUMMARY OF THE INVENTION

It has been found, according to the present invention, that it was possible in such a configuration to limit the short-circuit current which the generator circuit-breakers must cut out to a current only slightly greater than the short-circuit current of the generator. For that purpose, a disposition in which each generator circuit-breaker comprises a main cut-out chamber shunted by an auxiliary cut-out chamber in series with an impedance and a sequence of operations causing, when a failure occurs in one of the separate circuits, firstly the opening of the main cut-out chambers of all the circuit-breakers controlling the circuits not affected by the failure, then successively the opening of the main cut-out chamber and of the auxiliary cut-out chamber of the circuit-breaker controlling the circuit affected by the failure and lastly the closing of the main cut-out chambers of the circuit-breakers controlling the circuits not affected by the failure.

The invention will be explained in greater detail with reference to the diagrammatic figures enclosed herewith. In these figures, for simplicity's sake, only the case of two circuits fed by a generator has been taken into consideration, but the invention obviously covers a greater number of circuits.

DESCRIPTION OF THE PRIOR ART

Figure 1:
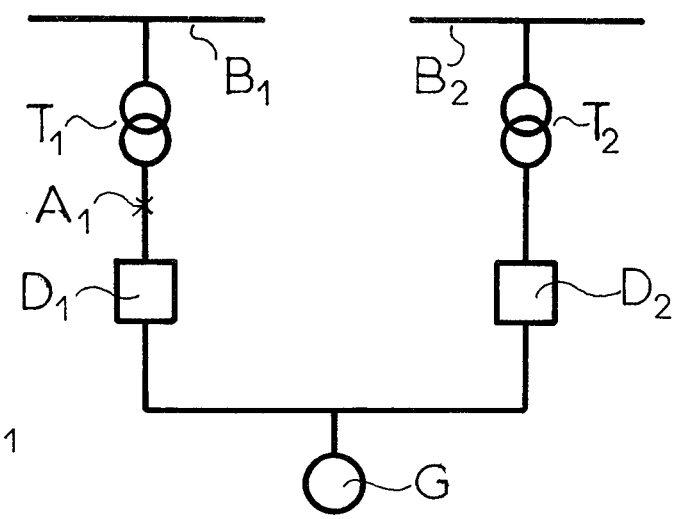
FIG. 1 is an electrical schematic diagram of cut-out system.

In the configuration in FIG. 1, a generator G feeds two sets of bars B1 and B2 of two separate networks in the case of B1, through a transformer T1 and a circuit-breaker D1 and, in the case of B2, through a transformer T2 and a circuit-breaker D2.

DESCRIPTION OF THE PREFERRED EMBODIMENT

Figure 2:
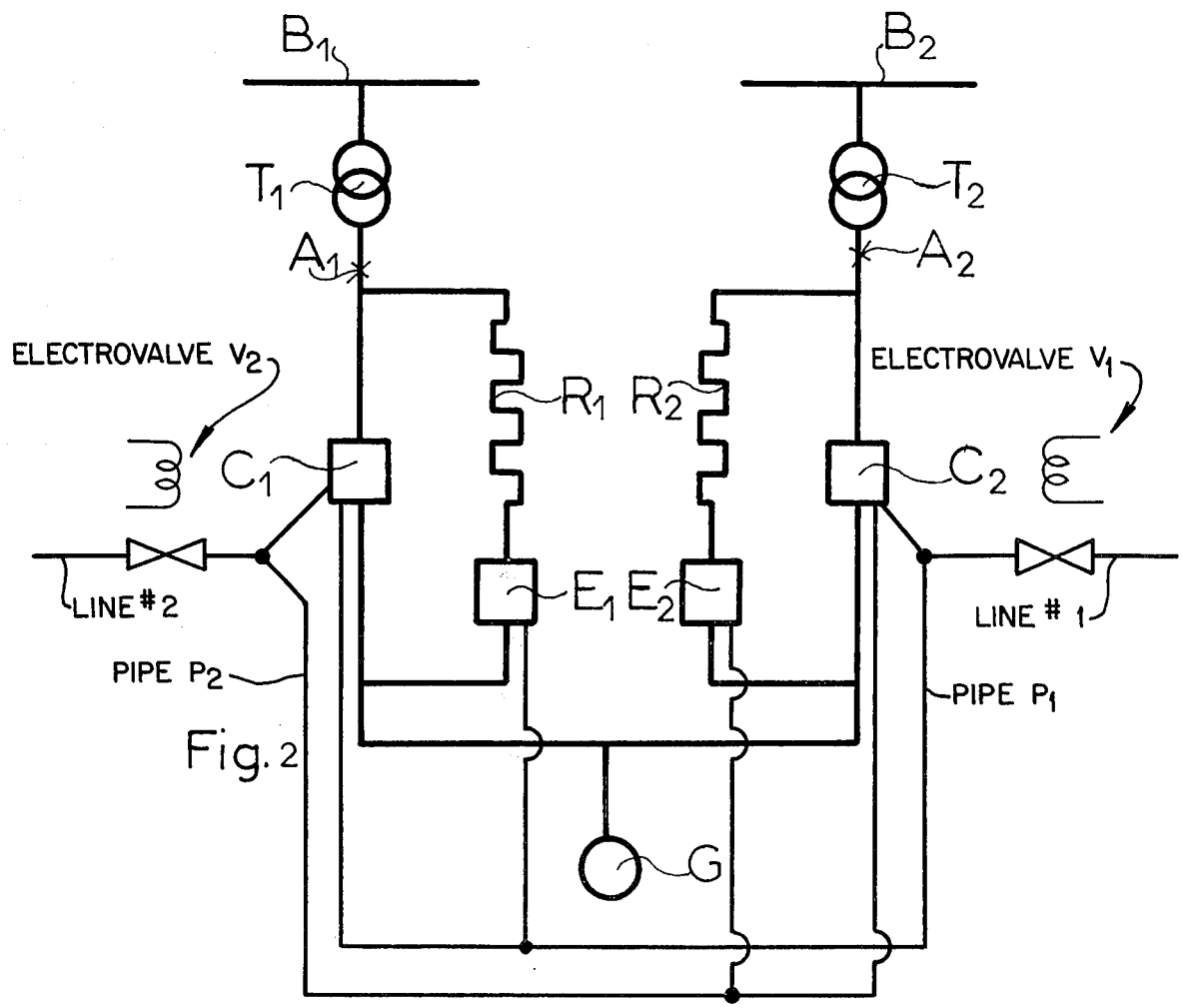
FIG. 2 is an electrical schematic diagram of a second embodiment of the present invention.

In the configuration in FIG. 2, the circuit-breakers D1 and D2 in FIG. 1 each comprise a main cut-out chamber C1 (or C2) shunted by an assembly constituted by an auxiliary cut out chamber E1 (or E2) in series with a resistor R1 (or R2). The chambers C1 and C2 must be able to withstand the rated current of the transformer T1 (or T2) in steady state and be able to close and withstand for a short time (during a short-circuit at the point A1, for example) a short-circuit current equal to the sum of the short-circuit current of the generator and the short-circuit current coming from the second network. However, because of the configuration of this invention, at the time of cutting out, the chambers C1 and C2 will have to cut out only a very reduced short-circuit current which is equal to the sum of the short-circuit current of the generator G and the short-circuit current of the other network B2 or B1 limited by the resistor R2 or R1 of the other circuit-breaker. The auxiliary cut-out chambers E1 and E2 having smaller dimensions do not withstand the rated current in steady state but withstand only the current limited by the resistor R1 or R2 during the fairly short time corresponding to the opening of the main chamber C1 or C2 which shunts it, this being during the operations described hereinbelow. These chambers cut out the current limited by the resistor R1 or R2. The resistors R1 or R2 are identical resistors dimensioned in such a way that, when the main chambers C1 and C2, one (e.g. E1) of the secondary chambers are open, i.e. when the generator G is connected to only one of the network (B2) through a resistor (R2), the current of the generator crossing the resistor (R2) is sufficiently high for the generator to remain connected to this network (B2). Also, the ohmic value of these resistors R1 and R2 is sufficiently high to reduce the short-circuit current of the networks B1 (or B2) greatly. The current then passing through the resistor R1 or R2 can more particularly be in the same order of magnitude as the steady state rated current of the chambers C1 or C2.

The sequence of the operations according to the invention is as follows: the occurrence of a failure in the network B1 (e.g. at A1) causes firstly the opening of the chamber C2 which cuts out only the short-circuit current flowing from the network B2. This opening inserts the resistor R2 in series on the circuit connecting the generator G to the network B2. The short-circuit current in the chamber C1 is then reduced to the sum of the current discharged by the generator G and the current coming from the network B2 via the resistor R2. The chamber C1 opens and the resistor R1 acts as a resistor for damping the transient voltage appearing at the terminals of the chamber C1, then the chamber E1 opens and interrupts the current flowing through the resistor R1. During the sequence of the opening of the chambers C1 and E1, the generator remains connected to the network B2 through the resistor R2. After the opening of the chambers C1 and E1, the generator is isolated from the failure A1; the chamber C2 is then closed and the generator can again deliver its power or a fraction of first power to the netword B2.

In these conditions, the chamber C2 cuts out only the current coming from the network B2 and the chamber C1 cuts out only the sum of the current from the generator and the resistor-limited current. These currents are much less than the sum of the current of the generator and the total current which could be delivered by the netword B2.

If a short-circuit occurs at A2, it is obvious that a symmetrical operation sequence (opening of C1, then of C2, then of E2 and lastly closing of C1) is used.

The two circuit-breakers are generally equipped with two tripping lines automatically providing the operation sequences. In the case of a short-circuit at A1, the line No. 1 controls C2 more rapidly than C1 then causes the opening of E1 without affecting E2. The line No. 2, brought into action by a short circuit at A2, causes successively the opening of C1, then of C2, then of E2, without affecting E1. Several devices make it possible to effect these operation sequences. Examples for a failure occurring at A1 will now be described.

Firstly, it is possible to:

cause the immediate opening of the chamber C2 by means of an electrovalve $V_1$ within line No. 1, FIG. 2. Downstream from the electrovalve $V_1$, a pipe $P_1$ fed by the opening of the latter connects the electrovalve of the chamber C2 to the chamber C1 and causes successively the delayed opening of the chamber C1, then of the chamber E1, due to a time shift brought in by the progressive rising of the pressure in the connection pipe $P_1$. Electrovalve $V_2$ within line No. 2 and pipe $P_2$ act conversely upon energization of that electrovalve.

The opening instruction can also be transmitted electrically to the chamber C2, and also electrically to the chamber C1, but through a time delay relay, then pneumatically or electrically to the chamber E1.

The opening instruction could equally well be transmitted electrically to the chambers C2 and C1, but with the delay in the opening of the chamber C1 being obtained by means of a pneumatic device.

After the opening of the chambers C2, C1 and E1, the closing of the chamber C2 is obtained due to an electric time delay means or a pneumatic automatic means.

All the electrovalves can be doubled for the sake of redundancy, each electrovalve indicating its operation by means of a pressure or discharge gauge, in order to inform the personnel of any loss of redundancy. To effect the operation sequences, any combination of the preceding devices can be used. Furthermore, it is evident that symmetrical devices enabling the necessary operation sequence to be effected when the failure occurs at A2.

The resistors such as R1 and R2 can be replaced by other impedances, but resistors are preferably used.

What is claimed is:

1. An electrical power supply system comprising: a generator, a plurality of separate load circuits, said generator being connected to each load circuit by a generator circuit-breaker corresponding to the load circuit, each generator circuit-breaker comprising a main cut-out chamber shunted by an auxiliary cut-out chamber connected in series with a power-dropping impedance, and means for operating said circuit-breakers associated with said generator in the event of a short-circuit failure occurring on one of the load circuits, in the following sequence: firstly, to open the main chamber of each circuit-breaker which is not connected to the failure; secondly, to open the main cut-out chamber of the circuit-breaker which is connected with the failure; thirdly, to open the auxiliary cut-out chamber of the circuit breaker connected to the failure; and finally, to close the main cut-out chamber of each circuit-breaker not connected to the failure.

2. The system according to claim 1, wherein the power-dropping shunt impedance of each of the circuit-breakers is sufficiently low to enable the generator to remain connected through this impedance, to each of the circuits not affected by the failure and is sufficiently high to reduce the short-circuit adequately.

3. The system according to claim 1, wherein the shunt impedances of the circuit-breakers are resistors.

4. The system according to claim 3, wherein said means for operating said circuit-breakers comprise means for connecting said resistors such that the shunt resistors (R1, R2) damp the transient voltage which appears across the main cut-out chamber of the circuit-breaker which is connected to the failure at the time this said main cut-out chamber is open.

5. The system according to claim 1, wherein said operating means comprises each of the main cut-out chambers having electrovalves downstream from which is connected a pipe connected to the opening device of the cut-out chambers of the other circuit-breakers, and means responsive to the detection of the failure in a circuit for energizing the electrovalves and the opening of the main cut-out chambers of the circuit-breakers of the circuits not affected by the failure and means for opening the main chamber of the auxiliary chamber of the circuit-breakers of the defective circuit, with a delay due to the slowing down of the rise in pressure in the connection pipes.

6. The system according to claim 1, wherein said operating means comprise means for opening the main cut-out chambers of the circuit-breakers not affected by the failure and pneumatic time delay means for opening the circuit-breaker of the defective circuit.

7. The system according to claim 1, wherein the opening of the auxiliary cut-out chamber of the circuit-breaker of the defective circuit is controlled by a pneumatic delay device.

8. The system according to claim 1, wherein the closing of the main cut-out chambers of the circuit-breakers of the circuits not affected by the failure is ensured by an automatic pneumatic means.

* * * * *